US006793807B2

(12) United States Patent
Michel, Jr.

(10) Patent No.: US 6,793,807 B2
(45) Date of Patent: Sep. 21, 2004

(54) LIQUID POLLUTANT SKIMMING SYSTEM

(76) Inventor: Russell Robert Michel, Jr., 111 King's Way, Apt. 111, Del Rio, TX (US) 78840

(*) Notice: Subject to any disclaimer, the term of this patent is extended or adjusted under 35 U.S.C. 154(b) by 58 days.

(21) Appl. No.: 10/237,997

(22) Filed: Sep. 9, 2002

(65) Prior Publication Data

US 2003/0010685 A1 Jan. 16, 2003

Related U.S. Application Data

(63) Continuation of application No. 09/847,294, filed on May 3, 2001, now abandoned.

(60) Provisional application No. 60/202,527, filed on May 8, 2000.

(51) Int. Cl.[7] .......... E02B 15/04

(52) U.S. Cl. .......... 210/122; 210/242.3; 210/923

(58) Field of Search .......... 210/122, 242.1, 210/242.3, 540, 923

(56) References Cited

U.S. PATENT DOCUMENTS 3,237,774 A * 3/1966 Schuback .......... 210/242.3
3,615,017 A * 10/1971 Valdespino .......... 210/242.3
3,688,506 A * 9/1972 Marcocchio et al. .......... 210/242.3
3,756,414 A * 9/1973 Crisafulli .......... 210/242.3
3,860,519 A * 1/1975 Weatherford .......... 210/242.3
3,966,615 A * 6/1976 Petchul et al. .......... 210/923
4,372,854 A * 2/1983 Szereday .......... 210/242.3
4,851,133 A * 7/1989 Rymal .......... 210/923
4,963,272 A * 10/1990 Garrett .......... 210/242.3
5,019,277 A * 5/1991 Andelin .......... 210/242.3
5,158,673 A * 10/1992 Halter .......... 210/242.3
5,215,654 A * 6/1993 Karterman .......... 210/122

* cited by examiner

*Primary Examiner*—Christopher Upton
(74) *Attorney, Agent, or Firm*—Jackson Walker LLP

(57) ABSTRACT

A system for skimming oil and other pollutants from the surface of a body of water. Each skimmer has a frame supporting and housing pumps, sensors, computers, and piping for separating the pollutant from the water and moving it to a collection and storage barge for further processing. The skimming operation is controlled by varying the approach angle of a skimmer toeboard, and the depth of the front end of the skimmer in the water. Hydraulic cylinders are used to pivotally position the toeboard. Air bags are used to control the depth of the skimmer in the water.

7 Claims, 3 Drawing Sheets

LIQUID POLLUTANT SKIMMING SYSTEM

This is a continuation application of U.S. patent application Ser. No. 09/847,294, filed May 3, 2001, now abandoned which claims the benefit of Provisional application No. 60/202,527 filed May 8, 2000, and incorporated herein by reference for all purposes.

BACKGROUND OF THE INVENTION

The present invention relates to a system for skimming liquid pollutants from the surface and near surface of a body of water. More particularly, the invention provides a system for pulling one or more skimmers through a body of water to skim, isolate, and remove obnoxious films, such as oil, from lakes, ponds, rivers, seas and oceans.

The new and unique system is designed for the process of cleaning up spills of toxic or hazardous liquid petroleum products, such as crude oils, fuel oils or gasoline in the oceans, lakes and rivers in fresh or salt waters and provides the ability to react quickly and effectively to any marine spill. The invention may be deployed quickly as needed and will substantially increase the speed and range of deployment. The invention may be used in shallow water right up to the shoreline as well as out in open sea.

The invention has a steel frame and may be built from stainless steel with various commercial electrical components and it may be manufactured in a wide variety of sizes.

The invention is simple in design and utilizes a computer system. Each computerized unit is reuseable. The invention has integrated lights on a headboard and a toeboard so the system can be fully utilized day or night. Three replaceable air bags are utilized for floatation with automatic height adjustment for each unit.

DETAILED DESCRIPTION OF THE PREFERRED EMBODIMENT

Figure 1:
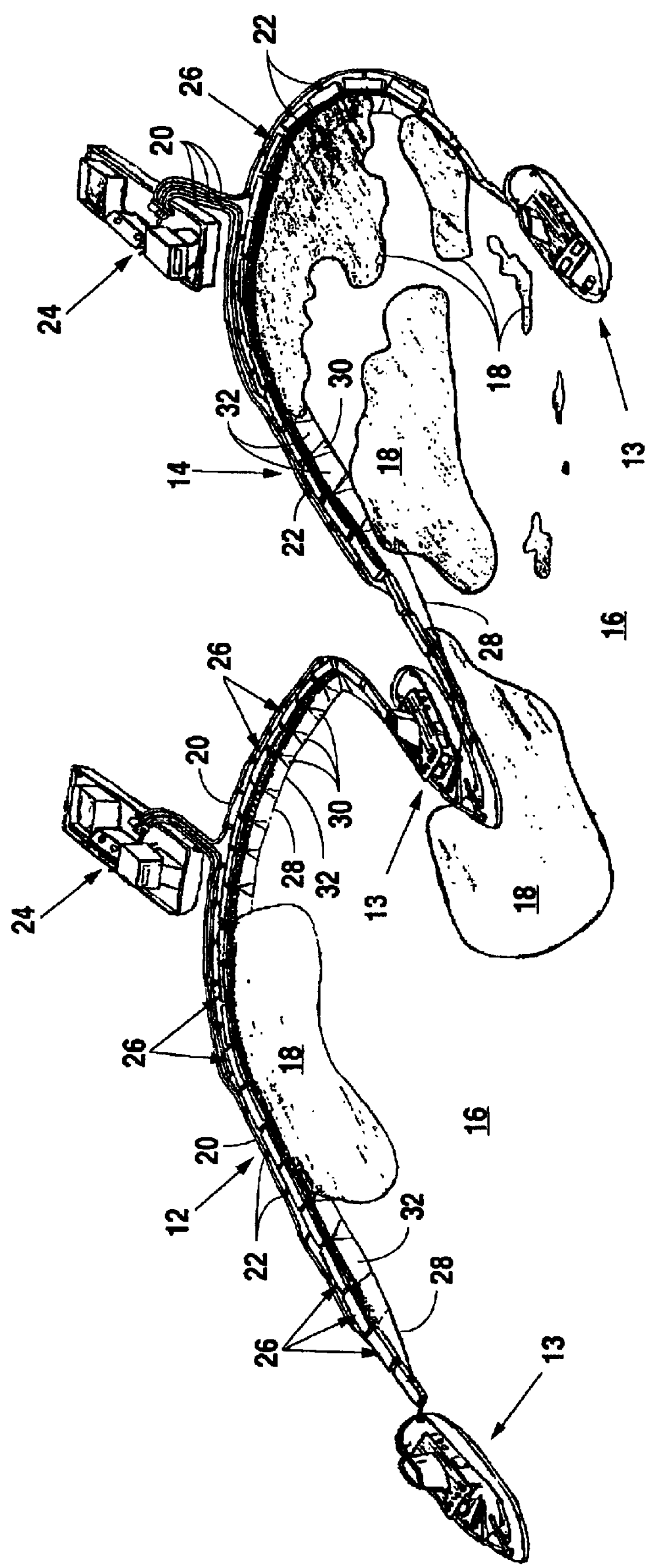
FIG. 1 illustrates a perspective view of the present inventive system being pulled through a body of water by a multiplicity of vessels with two collection, separation and storage units following.

FIG. 1 shows a perspective view of the present invention system with two sets 12, 14 of interconnected individual skimmers 26 which are being pulled by three vessels 13 through a body of water 16 having liquid pollutants 18 at or near the surface of the water 16. As can be seen from FIG. 1, each separate skimmer 26 is connected to a collection piping subsystem 20 by feed lines 22. The piping subsystem 20 is further routed to a collection, separation, and storage barge 24 for isolation and storage of the pollutants for removal from the body of water. The skimmers 26 are joined side-by-side and pulled by cable 28 passing through and supporting a connective barrier apron 30. Pollutants 18 are skimmed up on the aprons 30 and toeboards 32 and directed into collection flues or ports in the separate skimmers by adjustment of the approach angle of the unit toeboards 32 and the depth of the skimmers in the water as will be described below.

Figure 2:
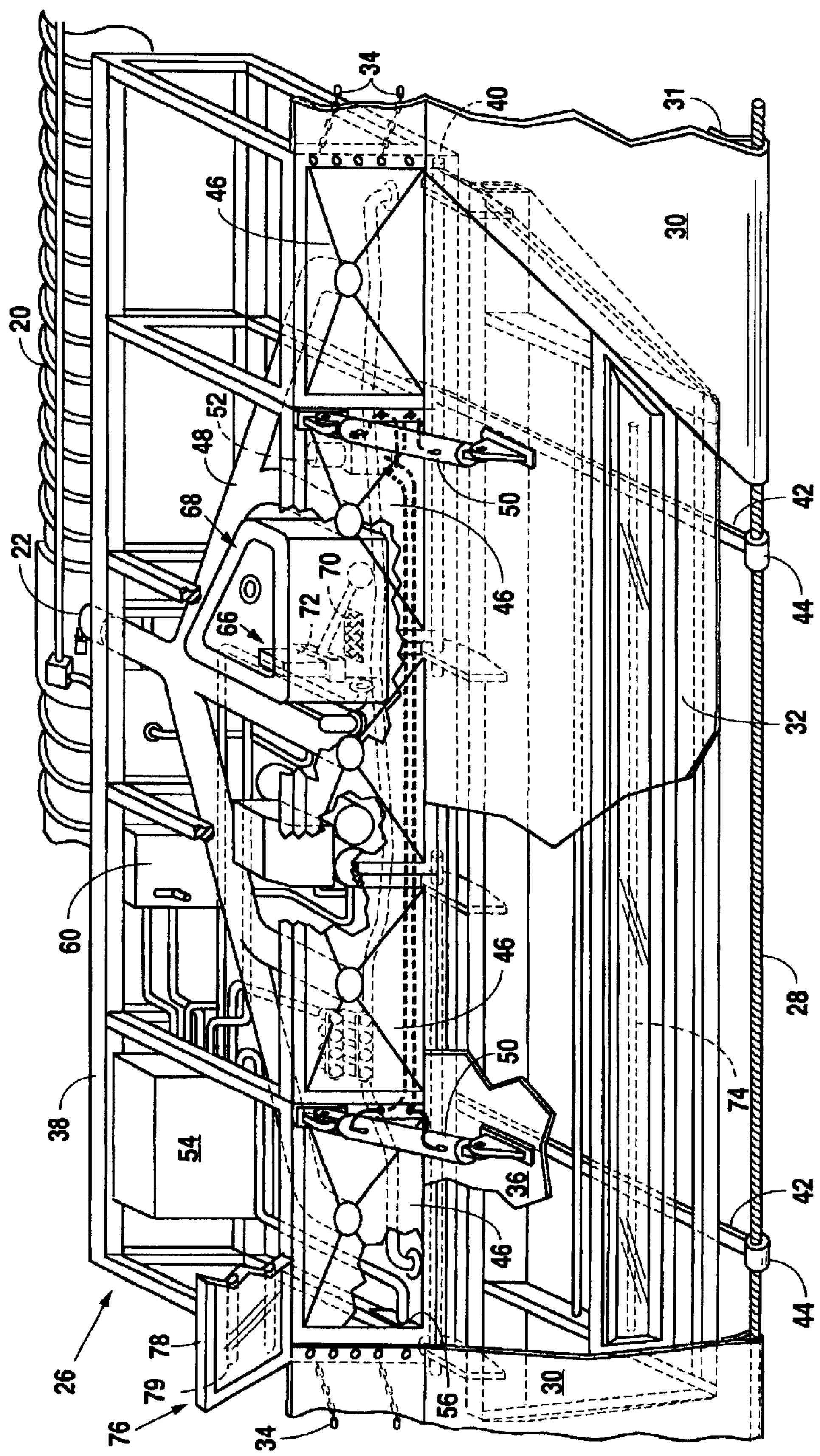
FIG. 2 shows a partial cut-away, perspective view of one of the skimmer units of the present invention.

FIG. 2 illustrates a partial cutaway perspective view of a single skimmer unit 26 of the present inventive system. It should be understood that a multiplicity of such skimmers may be connected by any number of connective linkages 34 including plates, chains, cable, links, and such functional and structural equivalents.

The individual skimmer 26 may be housed on board a ship and deployed one by one off a roller conveyor system (not shown) to be assembled or interconnected in the water. The barrier aprons 30 may be made of nylon-corded, reinforced rubber which overlaps between skimmer 26 along the top surface 36 of the toeboards 32 sufficiently to prevent skimmed pollutants from escaping or leaking between the skimmers as they are pulled through the water.

FIG. 2 illustrates that each skimmer 26 has a frame assembly 38 with an adjustable toeboard 32 pivotally affixed to the front end 40 of the frame assembly 38. Further attached to the front end 40 are towing straps 42. A towing cable 28 extends from the vessel or vessels through sleeves 44 in straps 42 and, further, through the distal end 31 of apron 30. Thus, when a number of separate skimmers are interconnected they may be pulled or towed by the vessels. Pollutants on the water flow up and across the toeboards 32 and the aprons 30 to the inlet ports 46 on the front end 40 of the frame. FIG. 2 illustrates a skimmer 26 with five separate inlet ports or flues 46. It should be understood that any number of ports may be used within a skimmer. The number of ports is dependent upon the overall size of a given skimmer system.

As the pollutants enter the ports 46, they flow by gravity or are drawn by a vacuum system into an extraction header 48 for eventual discharge through feed lines 22 into the piping subsystem 20 and finally into the collection, separation, and storage barges.

The approach angle of the toeboard 32 to the water surface is controlled by hydraulically actuated extension cylinders 50 attached to the front end of the frame assembly and the top surface 36 of the toeboard. Hydraulic pump 52 may be remotely activated by the operator through a computer 54 either housed within the frame or electronically communicating with a network computer housed on one of the towing vessels and sensor 56 at the toeboard. It will be understood that extending or retracting the cylinder rods will cause the toeboard to rise or lower the approach depth. Each skimmer 26 may have its own power supply 60 for operating the computer, sensors, pumps, and lights aboard the skimmer. However, in some circumstances an outboard power supply may be utilized with appropriate connections to the individual skimmers.

Figure 3:
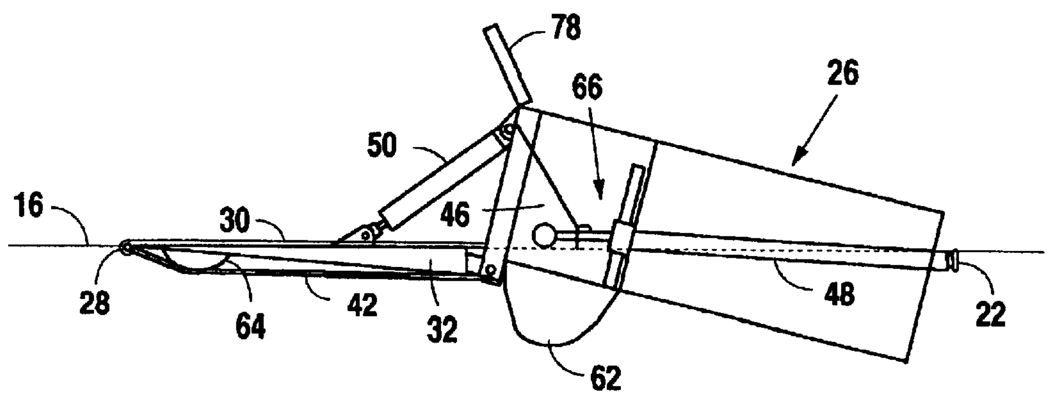
FIG. 3 is a side elevation view of one of the skimmers with the toeboard at water level for skimming a pollutant from the surface or near surface of a body of water.
Figure 4:
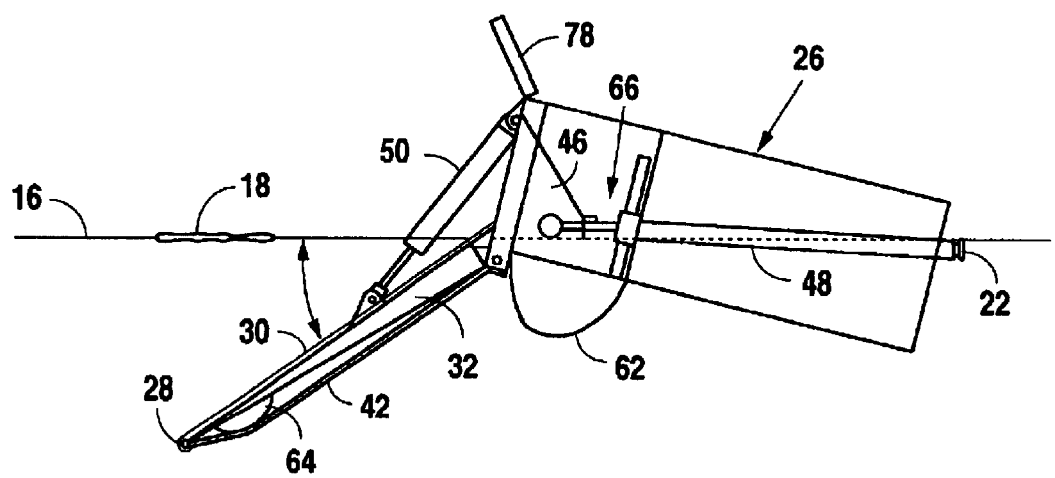
FIG. 4 illustrates a skimmer of the present invention in a side elevation view partially submerged in a body of water with the toeboard acting as a dam for collection of deeper depth pollutants.
Figure 5:
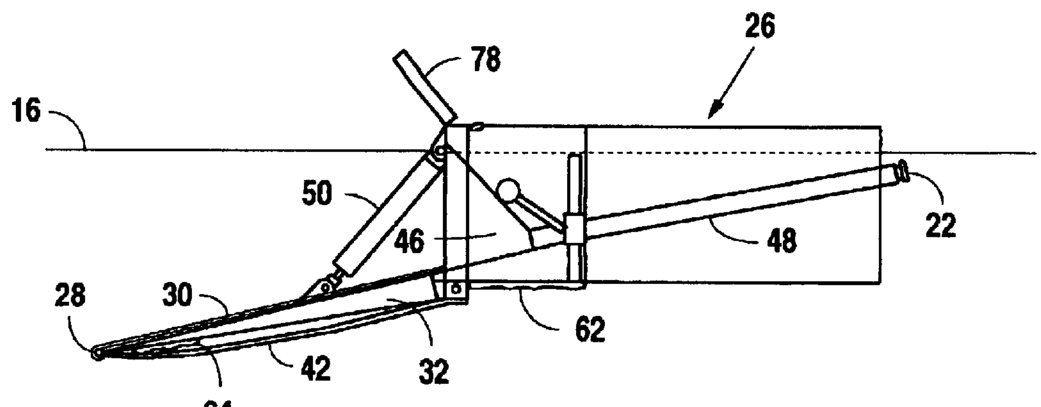
FIG. 5 is a side elevation view of a skimmer of the present invention submerged before the inflation of the floatation air bags.

As FIGS. 3–5 illustrate, the level of a skimmer may be controlled by inflation/deflation of frame air bags 62 attached to the underside of the front end of the frame and further by auxiliary air bags 64 affixed to the underside of the toeboard. Inflation/deflation of the bags 62 and 64 is further controlled by a skimmer level control sensing subsystem 66 housed within a water box 68 within the frame assembly.

The skimmer level control system 66 includes an adjustable float 70 and a mercury switch 72 well known in electronics control systems. Other level indication systems may be employed such as those having laser or photoelectric sensors. The switch 72 communicates with the computer system 54 to adjust the depth of the skimmer 26 within the body of water 16 by inflating or deflating bags 62 and 64. Inflation/deflation of bags 62 and 64 cooperates with the toeboard sensors 56 to combine approach angle variations with the depth of the skimmer 26 in the water.

Additional features in the present invention system include toeboard lighting system 74 and headboard lighting system 76 shown in FIG. 2. The integrated light system 74 in the toeboard 32 shines from beneath the water surface to indicate where the pollutant is located while the lights 79 in the headboard 78 shine down on the surface. The headboard 78 also ads as a splashboard for large waves. The lighting systems allow for twenty four hour spill recovery operations.

FIG. 3 illustrates a skimmer 26 with the toeboard 32 and apron 30 just at the water surface level 16. This has been achieved by inflation of air bags 62 and 64 in response to the level control system 66. The approach angle of the toeboard 32 has been achieved by operation of the hydraulic cylinder 50. Pollutants will flow across and over the toeboard and apron into port 46 and eventually be discharged through header 48 and feedline 22 to the collection and storage barge.

FIG. 4 shows that the approach angle A of the toeboard 32 has been varied to lower the toeboard to a deeper depth. Thus, the pollutants 18 are dammed and may eventually flow directly into the port 46.

FIG. 5 illustrates a skimmer submerged generally below the water level. The air bags have not been inflated to position the toeboard and front end of the unit to accept contaminants. The position shown in FIG. 5 is typical of how a skimmer would "naturally" flow after being disposed in the body of water for assembly and connection to other units.

Although the invention has been described with reference to a specific embodiment, this description is not meant to be construed in a limiting sense. On the contrary, various modifications of the disclosed embodiments will become apparent to those skilled in the art upon reference to the description of the invention. It is therefore contemplated that the appended claims will cover such modifications, alternatives, and equivalents that fall within the true spirit and scope of the invention.

What is claimed is:

1. A system to be pulled through a body of water for skimming liquid pollutants from said body of water comprising:

- a first skimmer unit having a frame assembly;
- a toe board skimmer adjustably affixed to a front end of said frame assembly;
- a first light source integrated into said toe board skimmer;
- an air bag and cooperative hydraulic unit operatively connected to said toe board skimmer for controlling the level of said toe board in said body of water; and
- a means for controlling the level of said frame assembly on said body of water.

2. The system of claim 1 further comprising a head board attached to an upper section of said front end of said frame assembly.

3. The system of claim 2 wherein a second light source is integrated into said head board.

4. The system of claim 1 wherein said means for controlling the level of said frame assembly on said body of water further comprises a water box having a level control sensor, said sensor operatively connected to at least one air bag attached to an underside of said front end of said frame assembly.

5. The system of claim 1 further comprising a means for remotely controlling said air bag and hydraulic unit.

6. A system to be pulled through a body of water for skimming liquid pollutants from said body of water comprising:

- a plurality of skimmer units each having a frame assembly;
- a toe skimmer adjustably affixed to each said frame assembly;
- an air bag and hydraulic unit operatively connected to each of said toe board skimmers;
- means for controlling the level of each of said frame assemblies on said body of water;
- a barrier apron extending over and between each of said toe board skimmers; and
- a pull cable extending through a front end of said apron, said cable connecting each of said plurality of skimmer units to one another.

7. The system of claim 6 further comprising a means for remotely controlling each of said air bag and hydraulic units.

* * * * *